United States Patent [19]

Harnum et al.

[11] Patent Number: 5,231,661
[45] Date of Patent: Jul. 27, 1993

[54] TELEVISION VIEWING CONTROL DEVICE AND METHOD

[75] Inventors: Niels Harnum, Roseville; George Tate, El Cajon; Stan Cox, Palmdale, all of Calif.

[73] Assignee: Gold Medal Kids, Inc., Calif.

[21] Appl. No.: 738,514

[22] Filed: Jul. 31, 1991

[51] Int. Cl.$^5$ .......... H04N 7/167; H04K 1/00
[52] U.S. Cl. .......... 380/7; 358/349
[58] Field of Search .......... 358/349; 380/7, 15, 380/10; 455/181, 186

[56] References Cited

U.S. PATENT DOCUMENTS

| | | |
|---|---|---|
| 4,081,754 | 3/1978 | Jackson . |
| 4,085,422 | 4/1978 | Niwata et al. .......... 380/7 |
| 4,219,693 | 8/1980 | French . |
| 4,317,213 | 2/1982 | DiLorenzo .......... 358/349 |
| 4,348,686 | 9/1982 | Beier .......... 358/349 |
| 4,566,033 | 1/1986 | Reidenouer .......... 358/349 |
| 4,567,516 | 1/1986 | Scherer et al. .......... 380/7 |
| 4,801,935 | 1/1989 | Cairns . |
| 4,888,796 | 12/1989 | Olivo, Jr. . |
| 4,930,158 | 5/1990 | Vogel .......... 380/5 |
| 5,051,837 | 9/1991 | McJunkin .......... 358/349 |
| 5,060,079 | 10/1991 | Rufus-Issacs .......... 358/349 |

Primary Examiner—Salvatore Cangialosi
Attorney, Agent, or Firm—Bernhard Kreten

[57] ABSTRACT

A device and method for controlling television usage by children or other users. The owner (e.g. parent) of the device establishes user access codes for authorizing multiple users and bestows a time allowance to each of the users to control viewing of any of several video signals (i.e. television, VCR, video entertainment systems). Each user who has been given an allotted time may have the time replenished periodically, i.e. weekly. Each user's coded and allotted time is decremented for each amount of actual viewing time used. An activating means controls the switches and the selected video signal, and upon matching the user entered code against the owner selected code, determines whether viewing will be blocked or unblocked. Any unmatched code switches the signal to the off-state of the device's apparatus.

22 Claims, 6 Drawing Sheets

TELEVISION VIEWING CONTROL DEVICE AND METHOD

FIELD OF THE INVENTION

This invention relates generally to a method and apparatus for controlling television, VCR, video entertainment system and RF signals, wherein a device is provided which meters out only a certain amount of television time to viewers. For example, each viewer is provided with a pre-designated code and a set weekly allotment of television viewing time. Once the pre-programmed allotment of time is exhausted, the incoming signal to the television is disrupted and the viewer cannot utilize the television.

BACKGROUND OF THE INVENTION

Television viewing and other related forms of movie watching and video game playing through the use of external devices connected to a television has long been a source of entertainment for children and adults alike. However, over the course of a long period of advancement in television viewing, the problem has risen that too much time is spent watching or using the television for entertainment purposes by both children and adults.

Prior art patents do not address the real problem of how much time can be spent watching television, playing video games, or watching movies on a VCR. Some devices simply block out certain channels altogether.

Another feature of the prior art devices is that they disrupt the power signal directly to the television rather than disrupting the incoming television signal. Thus, state of the art televisions which provide clocks and timers would have to be reset each time the power is disabled.

The following prior art describes the ongoing efforts of others attempting to solve this long standing problem which has yet evaded solution, and these prior art citations are included to discharge applicant's acknowledged duty to disclose prior art with which he is familiar:

| INVENTOR | PATENT NO. | ISSUE DATE |
| --- | --- | --- |
| Jackson | 4,081,754 | March 28, 1978 |
| French | 4,219,693 | August 25, 1980 |
| DiLorenzo | 4,317,213 | February 23, 1982 |
| Beier | 4,348,696 | September 7, 1982 |
| Reidenouer | 4,566,033 | January 21, 1986 |
| Scherer, et al. | 4,567,516 | January 28, 1986 |
| Cairns | 4,801,935 | January 31, 1989 |
| Olivo, Jr. | 4,888,796 | December 19, 1989 |
| Vogel | 4,930,158 | May 29, 1990 |

One of the main drawbacks of the prior art devices is that they interrupt the power to the television, i.e. outgoing power signal, rather than the RF, video game box, or other form of entertainment system attachable to a television set, i.e. incoming power signal.

For example, the patent to Reidenouer teaches the use of a regulator unit including a solid state timer activated by a reed switch. The unit is installed between the television receiver and a wall outlet. After a predetermined time period, the television receiver is turned off automatically so that viewing time can be controlled. The device is activated by the insertion of a metal token. This is one of the type of devices mentioned above which disrupts the internal clock of the television, VCR, etc. by interrupting the power.

The patent to DiLorenzo teaches the use of selectively hindering reception of regular program television broadcasts on a timed basis. The purpose of the device is to censor the broadcast rather than provide a specific allotment of time to a viewer. Further, the device is limited in that it has the ability to be attached to only one external appliance at a time.

A further deficiency in the prior art devices is that they do not allow for the programming of a pre-designated time for pre-designated users so that the pre-designated user is in control of the television and viewing allowance time. In the present invention the user is allowed to determine when and what shows will be watched, or when and what video games will be played. Stated alternatively, given an amount of time, the user determines how to best use it. Thus, a method is herein provided for learning how to budget one's time.

SUMMARY OF THE INVENTION

The instant invention is distinguished over the known prior art in a multiplicity of ways. From one perspective, the device disclosed herein interrupts the information signal to the television and not the power. In this way, the television does not need to have its internal devices reset each time the device is activated. More specifically the device is configured such that it has the ability to control RF signals ranging at least over the currently used spectrum: i.e. from as low as 56 MHz (e.g. channel 2) to as high as over 600 MHz (e.g. channel 69). The device has the ability to block incoming RF signals in such a wide spectrum of MHz by utilizing wideband carrier diode switches that attenuate or block video signals. The incoming video signal is prevented from inputting to the television. Thus, the device has the ability to successfully block both low and high frequency commercial broadcasts (visual and/or audio) as well as a game video (low frequency). Therefore, this device eliminates the necessity to disrupt the power to the television.

Further, because the device has the ability to block the RF signal, the controller of the instant invention is configured to control several external devices, i.e. a television, entertainment system, VCR, radio frequency, any modulated video signals within the passband, etc. The controller includes multiple input RF power source terminals and an output RF power source terminal. Thus, the user may attach and control a plurality of devices to the controller at any given time.

Moreover, the device is configured to be easily programmed to monitor and control a user's time. The device maintains a running tabulation of each viewer's time allotment remaining for television/video utilization. When the allotment has been used, the RF signal is blocked and the television ceases to provide output in a useable format. For viewers who spend inordinate amounts of time watching television, this device can instill discrimination and time consciousness in the viewer.

OBJECTS OF THE INVENTION

Accordingly, it is a primary object of the present invention to provide a new and useful TV/video game controller.

It is a further object of the present invention to provide a device as characterized above which is relatively inexpensive to manufacture, benefits from mass production techniques, is durable and safe to use and is affordable for the average viewing family household.

A further object of the present invention is to provide a device as characterized above which efficiently allots a specific amount of time to a specific user in which a television, or related forms of entertainment may be watched and/or utilized by a user and which is not as accessible by known prior art devices.

A further object of the present invention is to provide a device as characterized above which not only blocks incoming visual signals to a television and/or entertainment system, but also further disrupts an incoming audio signal.

A further object of the present invention is to provide a device as characterized above which has the ability to block RF signals ranging in the spectrum from 56 MHz to 600 MHz. Thus, the device can block both low and high frequency commerical broadcasts, as well as a game video.

A further object of the present invention is to provide a device as characterized above which can be easily programmed and subsequently utilized by a young viewer.

Viewed from a first vantage point, it is an object of the present invention to provide a device as characterized above which provides a method for programming a controller, the steps including entering the programmer's master code, entering the signal source code, entering the current day and time, entering a user code, and inputting a time allotment for the user.

Viewed from yet another vantage point, it is an object of the present invention to provide a device as characterized above wherein a viewer develops good habits and skills in budgeting television viewing and/or video game playing time.

Viewed from yet another vantage point, it is an object of the present invention to provide a device as characterized above which controls television viewing time by providing a monitor, an incoming signal source operatively connected to the monitor and programming means interposed between the monitor and the signal source whereby an allotted amount of time is provided in which the monitor may be utilized by a user. Further, disruption means coupled to the programming means is provided such that when the programmed allotted time of a user is exhausted, the incoming signal source is disrupted.

Viewed from yet another vantage point, it is an object of the present invention to provide a device as characterized above which automatically resets an allotted time for a designated viewer on a predetermined schedule, e.g. weekly whereby television viewing time is controlled.

Viewed from yet another vantage point, it is an object of the present invention to provide a device as characterized above which may be selectively re-programmed during a prescheduled period for any designated viewer thereby temporarily allotting more or less viewing time to the designated viewer.

These and other objects of the present invention will be made manifest when considering the following detailed specification when taken in conjunction with the appended drawing figures.

DESCRIPTION OF THE PREFERRED EMBODIMENTS

Considering the drawing figures wherein like reference numerals denote like parts throughout the various drawing figures, reference numeral 4 is directed to a television/video game controller according to the present invention.

Figure 1:
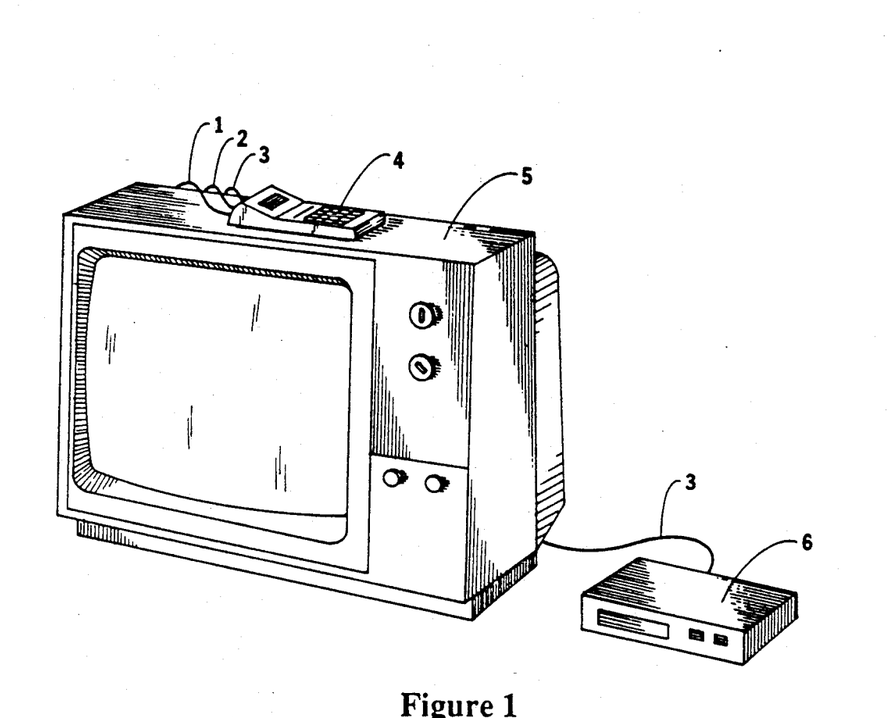
FIG. 1 is a TV/video game controller and its connection to a television and a video game box.
Figure 2:
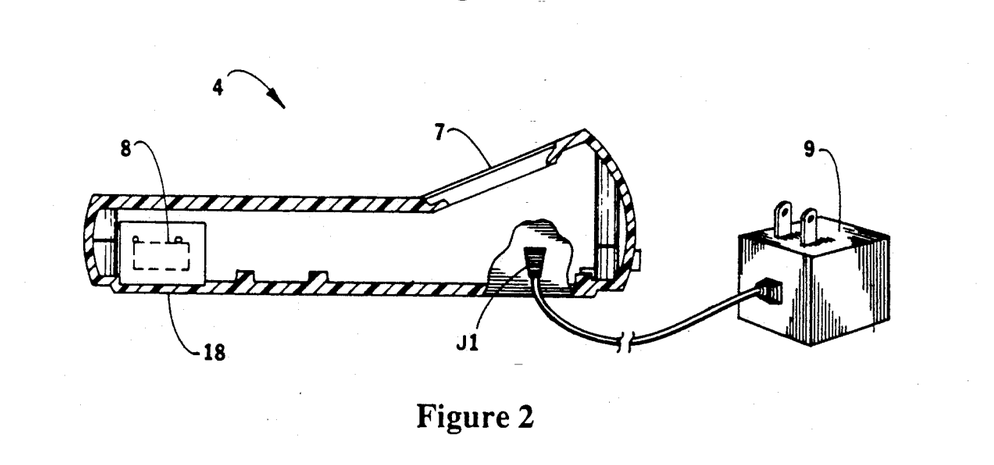
FIG. 2 is a side view of the TV/video game controller and further shows the power source locations.
Figure 3:
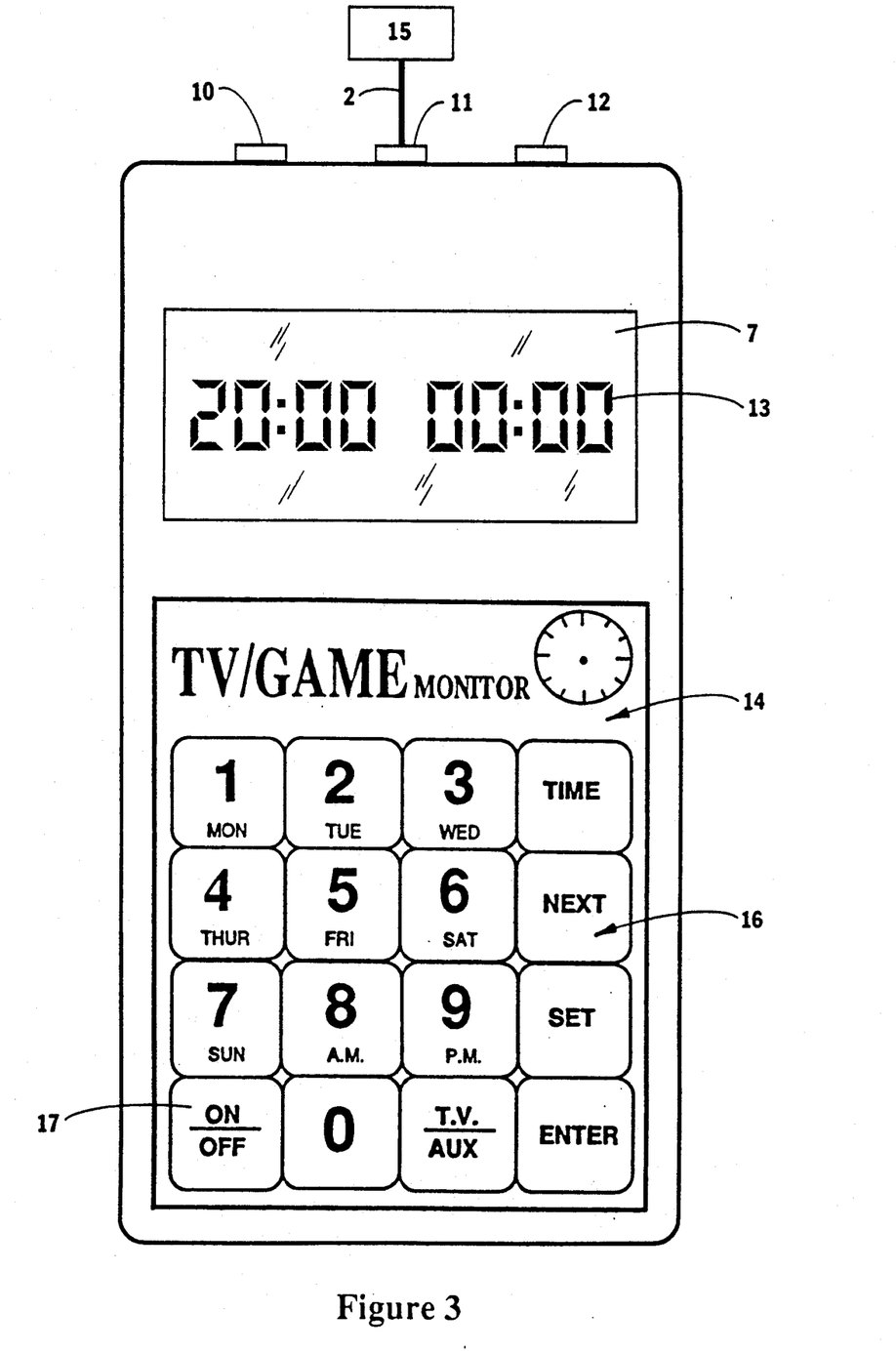
FIG. 3 is a top view of the TV/video game controller showing the key-pad and display.

More particularly, as shown in FIGS. 1 through 3, a television/video game controller 4 is provided which includes at least one output source defined as the terminal 10 and perhaps two input sources defined as cable terminal 11 and auxiliary terminal 12 (FIG. 3) operatively connected to the controller 4 through three shielded cables 1, 2 and 3 (FIG. 1). One input source, cable terminal 11 is further operatively connected to a television antenna and/or radio frequency signal source (RF) 15 via the opposite end of the cable 2. The second input source, auxiliary terminal 12, is further operatively connected to a video game box 6 (or video recorder; replay machine; or other auxiliary video input device), via the opposite end of the cable 3. The output terminal 10 is also further operatively connected to a television set or monitor 5 (or any other media device capable of receiving, displaying, storing, or handling RF analog or digital signals), via the opposite end of the cable 1.

The controller 4 is connected to both a 9-volt transformer 9 through a radio jack J1 and a 9-volt battery 8, thus providing a source of power to the controller 4 (FIG. 2). The battery 8 resides in a compartment at the forwardmost end of the controller 4 and the battery 8 is accessed through a cover 18 located on a bottom of the controller 4. The cover 18 is slideably removeable from the controller 4 for easy access, removal and replacement of the battery 8 as needed. An on/off switch 17 is provided on the controller 4 (FIG. 3). When the on/off switch 17 is in the on position, a display 7 provides visual indicia 13 that the controller 4 is operational. The normal operation of the controller 4 should be continuous, so long as the source of power is maintained or the battery 8 is not drained and the switch 17 is left in the on position. Therefore, should the transformer 9 be disconnected or the power mains be interrupted, the battery 8 will maintain the continuous operation of the controller 4 programmed memory. The duration of time which the memory stored in the controller 4 will be maintained by the battery 8 is dependent on the type of battery 8 which has been placed in the controller 4. By thus maintaining an independent source of power to the controller 4 the program and memory stored in the controller will not be lost in the event of interruption from main source of power to the controller.

Referring now to FIG. 3, a top view of the controller 4 is shown wherein user interface and control of the television 5 and video game box 6 (FIG. 1) is effected via a visual display 7, including visual display indicia 13, select elements or buttons defined as a sixteen key-pad array 16, output terminal 10, input cable terminal 11, and input auxiliary terminal 12. More specifically, output terminal 10 is connected to the television set 5 through the use of a shielded two conducutor output cable 1. Two input terminals 11, 12 are connected to two video analog or digital signals through the use of two shielded two conductor input cables 2,3. The input cable and auxiliary terminals 11, 12 are connected through cables 2, 3, to any two video sources which a user desires to selectively switch on and off and further selectively program for time, viewer, etc.

The controller 4 is designed to match a 75 ohm characteristic impedance for standard video coax cables. However, other characteristic impendance cables may be used, but when another impedance cable is used some performance degradation at the higher video frequencies is realized. As discussed above, the input cables 2, 3 may be attached to optional video analog or digital signals as selected by the user. Thus, other types of signals which may be selected and controlled are modem signals via telephone lines, voice lines, closed circuit television, etc. In its essence, the device is passive, thus, no requirement is placed on the signal sources.

The display 7 includes visual display indicia 13 allowing the owner to view programming selections, time allotted to each user, time remaining for each user, time of day, user codes and owner codes. Additional user friendly prompts are also viewable to assist the programmer and user in the operation of the device, i.e. user mode of operation, either television or video game, etc.

The controller 4 includes a selection area 14 defined by a sixteen key-pad array 16 arranged to match the familiar telephone number sequence and also equipped with clearly identified programming function keys (FIG. 3). Some keys are marked with dual functions to provide the programmer with a simple manual entry device for programming user codes, user time, updating the internal time clock, selecting TeleVision/AUXiliary input, and ON/OFF.

Upon initial power-up of the device, the programmer enters the programmer's master code composed of any multi-digit (e.g. four) combination. The visual display 13 prompts the programmer to enter the programmer's master code by displaying ENTER CODE 0000 and further displays the programmer's master code as each number is entered by the programmer by depressing the corresponding numbers on the key-pad array 16.

Next, the ENTER key on the key-pad array 16 is depressed thus causing the device to change the visual display 13 prompt to FREE CODE 0000 and allowing the programmer to select any four digit code for turning on the selected signal source for an unlimited period of time.

After again selecting ENTER on the key-pad array 16, the programmer's master code and the FREE code will be indefinitely stored in the computer memory, until changed by the programmer or until all power to the device is terminated. If the power were to be terminated to the controller 4, when the power is subsequently restored, reprogramming will be required. However, note that as long as the battery 8 has sufficient voltage to power the controller 4, the computer memory will not be erased, even if the transformer 9 is disconnected from the controller 4 or corresponding wall socket.

After the programmer's master code and the signal source code are entered, the controller 4 will turn off. However, after the initial programming of these two codes, whenever the FREE code is subsequently entered by the programmer or a user, the selected signal will be turned on and will remain on until the OFF key on the key-pad array 16 is selected and depressed. Likewise, whenever the programmer's master code is subsequently entered, the controller 4 will automatically assume the program mode allowing the programmer to enter (or edit) up to six user number codes and their respective allotted user times.

Prior to entering the user codes and times, the programmer will program and set the controller 4 to display the current day and time. This is accomplished by first depressing the SET key on the key-pad array 16, thus causing the visual display to change to the DAY OF WEEK MON (or TUE, WED, THU, FRI, SAT, SUN) prompt. The day of the week which is selected is then displayed on the visual display 13, i.e. MON, TUE, etc. The day of the week is changed by selecting the corresponding day of week from the dual function keypad array 16 and pressing ENTER (FIG. 3). Next, the visual display 13 changes to the prompt ENTER TIME 00:00, which is changed to the correct time by selecting any 2 digit combination for the hour(s) (01 to 12) and any two digit combination for the minute(s) (00 to 60), defined as HH:MM. The clock is programmed to run on a 24-hour cycle. Once the hour(s) and minute(s) have been selected and entered by the programmer, the ENTER key on the key-pad array 16 is depressed thereby causing the visual display 13 to change to the meridian prompt A.M./P.M. A.M. To set the correct meridian, the dual function keys 8/A.M. or 9/P.M. is selected and then ENTER is depressed on the key-pad array 16.

The programmer will next program the user codes. The entry of user codes is assisted by the visual display 13 which displays user code, time given and time remaining prompts. Note that separate user times for TeleVision and AUXiliary can be programmed and updated at any time by first selecting and entering, on the key-pad array 16, the programmer's master code, user code, and SET.

Specifically, to initially enter the user codes, times given and times remaining, first, the programmer's master code is entered, next, the SET key on the key-pad array 16 is selected and depressed thereby causing the visual display 13 to display the prompt USER CODE 0000. The user code is entered by selecting any four digit combination, (as above, each number is displayed as it is entered), and then depressing the ENTER key on the key-pad display 16, thereby causing the visual display 13 prompt to change to TIME GIVEN 00:00. The time can be entered and changed by selecting any 2 digit combination for the hour(s) and any two digit combination for the minute(s), defined as HH:MM. The clock is programmed to run on a 24-hour cycle. Once the hour(s) and minute(s) have been selected and entered by the programmer, the ENTER key on the key-pad array 16 is depressed thereby causing the visual display 13 to change to TIME LEFT 00:00. The time left can be changed as described hereinabove for TIME GIVEN, or it may be left the same by simply again depressing the ENTER key on the key-pad array 16.

Depressing the NEXT key on the key-pad array 16 will cause the visual display to change to the succeeding user in order. In this way, the programmer may repeat the steps as above, entering codes and times for up to six users. After the sixth user is programmed, the display automatically changes to display the current day and time, as for example, Monday, 9:30 a.m. Once all the programmer's entries have been accomplished, the programmer may turn the controller 4 off by selecting the NEXT key on the key-pad array 16.

Once the controller 4 has been successfully programmed, users may begin to monitor their use and time of television and other related forms of entertainment. A user would first select the ON/OFF key on the key-pad array 16 to power-up the monitor. Next, the user would enter their pre-designated personal user code by depressing the specific numeric keys on the key-pad array 16, finally, the user would select either TV or AUX from the key-pad array 16, thus causing the visual display 13 to display the user's selected choice of TV or AUX in conjunction with the user's time for the specific signal code entered. In this way, the controller 4 will turn the selected signal source on for the time remaining for the specific user code entered. The remaining time is continuously displayed and automatically decremented on the visual display 13, until such time as the user selects and depresses the OFF key on the key-pad array 16 or the time remaining for the user code entered is exhausted. In either case, the result would be that the selected signal source will be terminated.

In the event an incorrect code or a code in error is entered by either the programmer or the user, the visual display 13 will change and prompt the programmer/user with INVALID CODE. The error is corrected by the programmer/user first selecting the OFF and then the ON key on the key-pad display 16 thereby clearing the error from the computer memory and subsequently re-entering the correct code.

Figure 4:
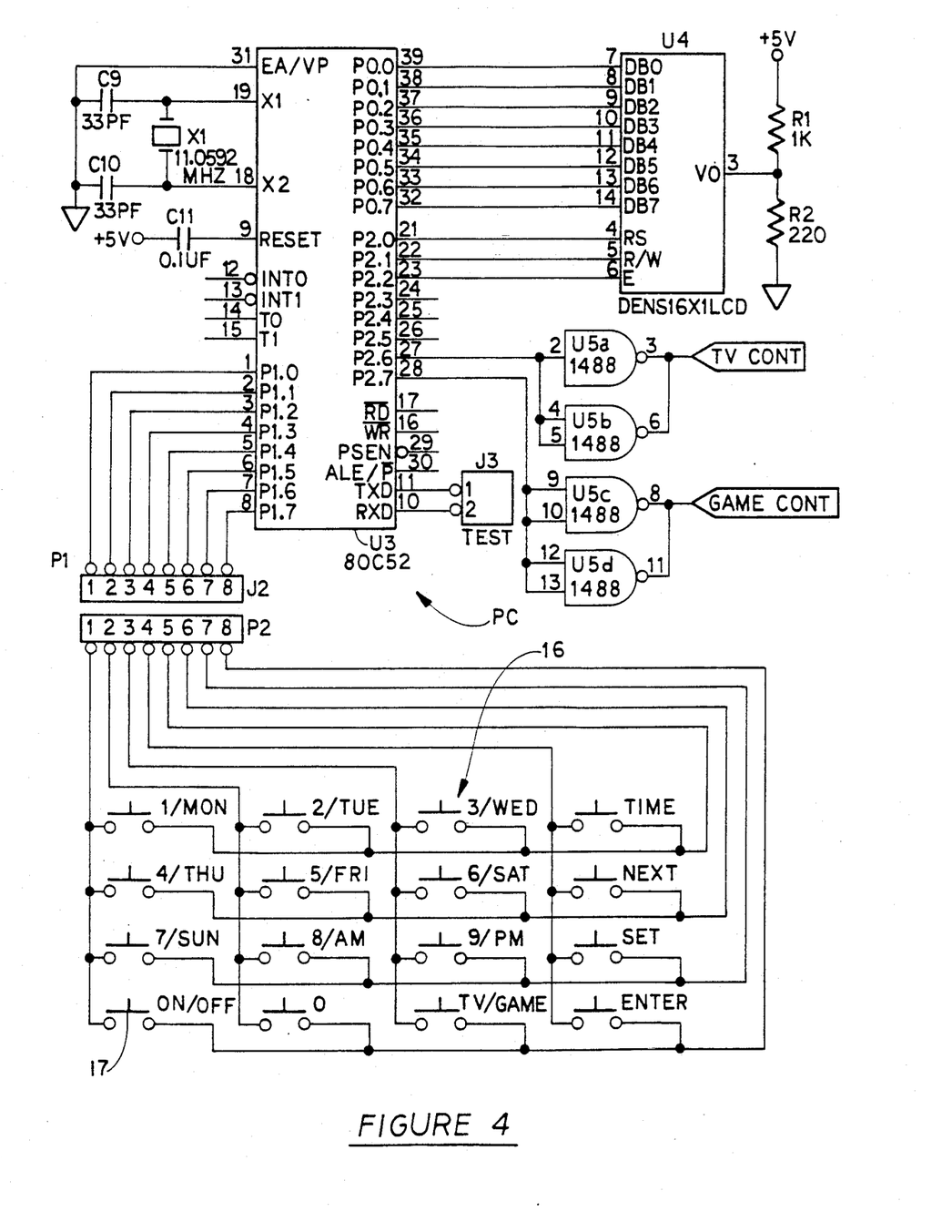
FIG. 4 is a schematic view of the TV/video game controller showing a system block diagram of processor circuitry.
Figure 5:
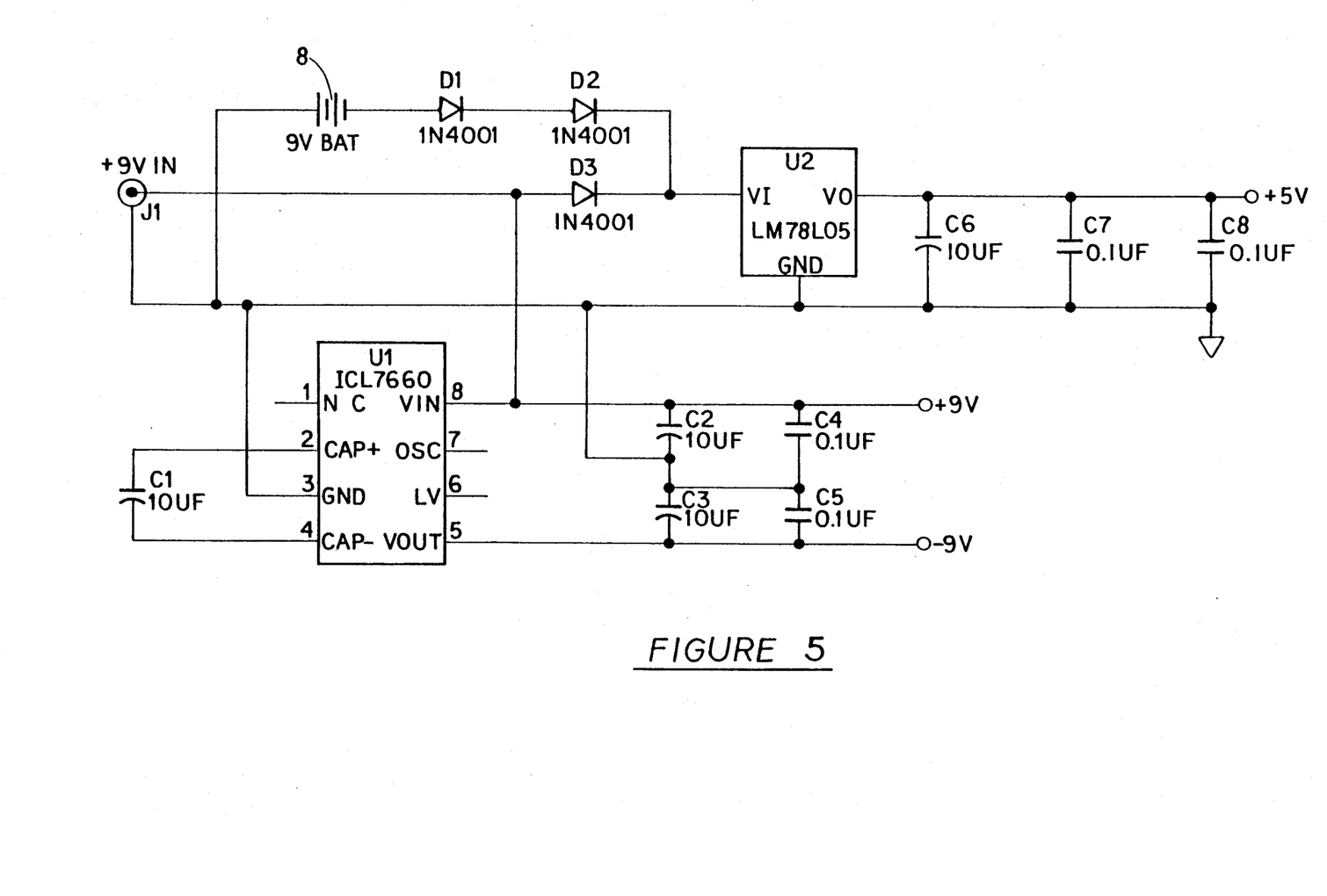
FIG. 5 is a schematic of a system block diagram showing power supply circuitry according to the present invention.
Figure 6:
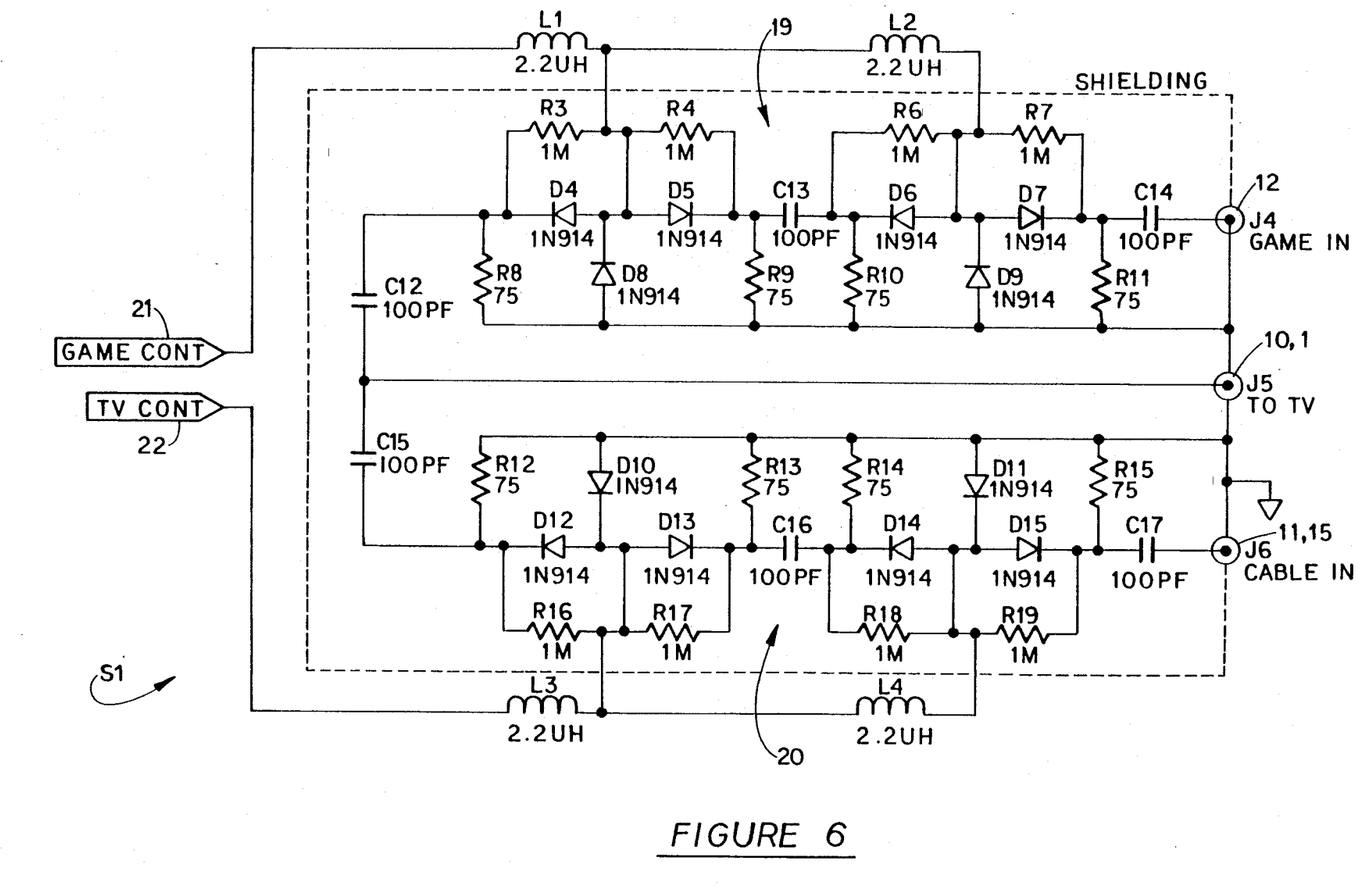
FIG. 6 is a detailed schematic of the system showing radio frequency switch circuitry according to the present invention.

FIGS. 4, 5 and 6 are directed to the detailed schematic of the controller 4. The circuit schematic is divided into three blocks, the Processor Circuit PC (FIG. 4), the Radio Frequency Switch Circuit S1 (FIG. 6), and the Power Supply Circuit PS (FIG. 5).

FIG. 4 is directed to the processor circuit PC which includes a microcontroller U3. The microcontroller U3 includes an address latch, and a Factory Programmable Read-Only-Memory (PROM) for program storage and an internal clock. Upon the initial power-up of the microcontroller U3, a $0.1 \mu F$ capacitor C11 is automatically reset. A sixteen key key-pad array 16 is read by the microcontroller U3 by using port P1 of the microcontroller U3. Upon the depression of selected keys on the key-pad array 16, the microcontroller U3 recognizes that the key-pad array 16 needs servicing or is transmitting codes and instructions. The microcontroller U3 is programmed to reinitialize time allotments periodically (e.g. weekly).

The output is displayed on a Densitron 16 character by 1 line alpha-numeric Liquid Crystal Display (LCD) U4. The internal clock within the microcontroller U3 is used for keeping time and for generating all interrupts. A plurality of gates MC1488 U5a, U5b, U5c and U5d are used to generate control signals to the RF Cable Switch S1 (FIG. 6).

Figure 7:
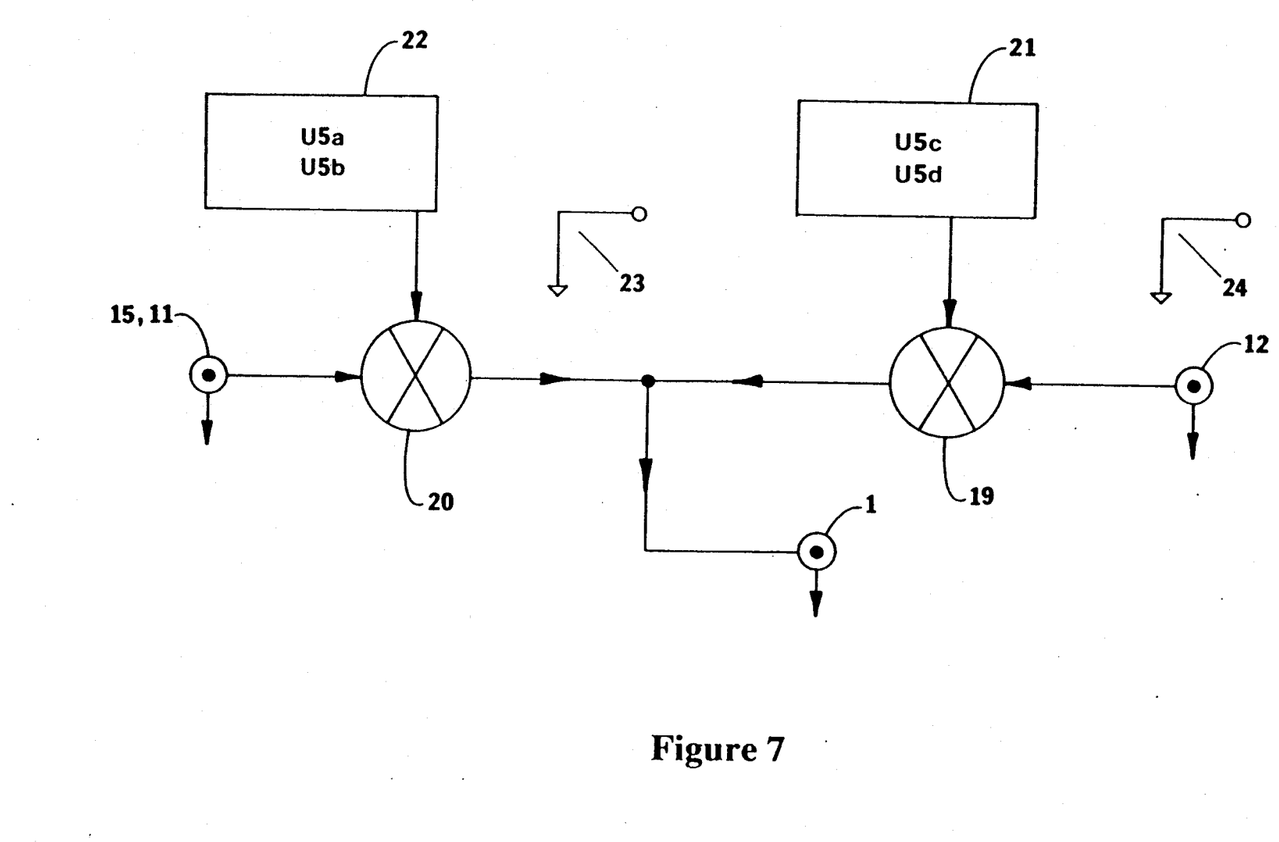
FIG. 7 is a further schematic of the system according to the present invention.

The RF Cable Switch S1 (FIG. 6) is configured as a single pole double throw electronic switch designed with PIN diodes, similar to an Archer 15-1267 Electronic TV/Game Switch and a single pole dual throw relay. When proper conditions are met, i.e. a user has entered a valid user code number, and the remaining time for that user is not exhausted, the microcontroller U3 will energize the selected TVON or AUXON line which, by action of a MC1488 chip which includes control gates U5a and U5b (TV CONT) or U5c and U5d (GAME CONT) and drivers 21, 22 (FIG. 7). The control gates U5a and U5b or U5c and U5d will provide sink current source or ground to the RF Cable Switch S1. All other conditions will pull these lines "high" or plus five volts. The RF Switch S1 will then allow transmission of selected signals to the television set 5 (FIG. 1).

Referring now to the power supply circuit shown in FIG. 5, the primary power source is from a 9-volt transformer 9 (FIG. 2) such as an Archer 273-1455A AC adapter connected to the +9 V In connector J1, which is operatively connected to the controller 4. In this way, 9 volts DC at 300 milli-amps are provided to the controller 4. The secondary power source is a standard 9 volt transistor battery 8. Two 1N4001 diodes D1 and D2 are used with the battery 8 to prevent it from discharging when power is available from the AC adapter. Diode D3 blocks the battery from operating all other functions except the microcontroller U3 and thus maintains memory and the stored programs for as long as the battery remains active. Should household AC power be lost or the AC Adapter fail or be removed, the battery 8 will provide back-up power to the microcontroller U3 circuits for a limited amount of time.

Further, the 9 V transformer input is regulated to +5 V by the action of a three terminal voltage regulator LM78L05, U2. Further, the 9 V may be inverted to −9 V by the action of a voltage inverter ICL7660, U1. Capacitors C6 ($10 \mu F$) and C7 ($0.1 \mu$) and C8 ($0.1 \mu F$) provide added noise filtering for the +5 V supply. The +5 V supply powers the integrated circuits U3, U4 and the control voltage for the divider circuits R1 and R2 (FIG. 4). Capacitors C2 ($10 \mu F$), C3 ($10 \mu F$), C4 ($0.1 \mu F$) and C5 ($0.1 \mu F$) filter noise signals from the +9 V and −9 V inverter U1. The +9 V and −9 V power is supplied to the MC1488, U5a, U5b, U5c and U5d (FIG. 4) control gates to provide bias for the diode Radio Frequency Switch S1 (FIG. 6).

Referring now to FIGS. 6 and 7, television signals from the auxiliary (GAME IN) input 12 are injected into a television broadband switch summing junction 19. The television broadband switch summing junction 19 is comprised of diodes D4, D5, D6, D7, D8 and D9. The switch summing junction 19 is divided into two attenuators and coupled via capacitors C14, C13 and C12 to the television outputs 10, 1. A negative (−9 V) signal is applied through chokes RFC-L1 and RFC-L2 thereby turning the RF switches off. In this way, the input RF signal from auxiliary input 12 normally generated to television output 10 is blocked. In the alternative, a positive (+9 V) signal may be applied through the same chokes RFC-L1 and RFC-L2 thereby turning the RF switches on, and thus allowing the input RF signal from auxiliary input 12 to pass unattenuated to television output 10. The driver 21 provides the drive capability to back bias and forward bias diodes D4, D5, D6, D7, D8 and D9, via control gates U5c and U5d (FIG. 4). When a diode is forward biased (+9 V), it acts like a low impedance to RF television signals and conversely, when a diode is reverse biased (−9 V), it acts like a high impedance and therefore blocks the RF television signal.

An additional embodiment, as further shown in FIGS. 6 and 7, is provided wherein an entertainment system or RF signal from the antenna 15 via CABLE IN input 11 is injected into a television broad band switch summary junction 20 comprised of diodes D10, D11, D12, D13, D14 and D15. The switch is divided into two attenuators and coupled via capacitors C17, C16 and C15 to the television output 10, 1. A negative (−9 V) signal is applied through chokes RFC-L3 and RFC-L4 thereby turning the RF switches off. In this way, the input RF signal from cable or antenna input 11 normally generated to television output 10 is blocked. In the alternative, a positive (+9 V) signal may be applied through the same chokes RFC-L3 and RFC-L4 thereby turning the RF switches on, and thus allowing the input RF signal from cable or antenna input 11 to pass unattenuated to television output 10. The driver 22 provides the drive capability to back bias and forward bias diodes D10, D11, D12, D13, D14 and D15, via control gates U5a and U5b (FIG. 4). As discussed above, when a diode is forward biased (+9 V), it acts like a low impedance to cable or antenna signals and conversely, when a diode is reverse biased (−9 V), is acts like a high impedance and therefore blocks the cable or antenna signals.

By applying the television control power signal 23 and/or the auxiliary control power 24 (FIG. 7) to both the cable input 11 and auxiliary input 12, both may be blocked simultaneously or individually, as commanded by the microcontroller U3 (FIG. 4).

While the intent of the present invention is to switch video signals on and off for preselected times for either of two video sources such as television player/recorder, television antenna, cable television, or video games, any two RF sources transmitted on shielded cable within the frequency range of the television band can be switched in the same manner. The purpose of using the shielded cable is to prevent any radiation originating at the signal source from crossing over the switch when the switch is off.

In its essence, the actual blocking of any RF signal received from an external device is accomplished by attenuating a signal on the received transmission. This forms a reduced, unintelligible RF signal.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A device for controlling television operation, comprising, in combination:
   a television monitor,
   an incoming signal source operatively connected to said monitor,
   an incoming power source operatively coupled to said monitor, and
   programming means interposed between said monitor and said signal source wherein said programming means allots an amount of time in which said monitor may be utilized by a user such as the monitor is utilized by the user an amount of time remaining of the original allotted amount of time is calculated,
   said programming means including a keyboard entry means and a securing means integral with said programming means, such that said programming means cannot be accessed by the user except upon inputting through said keyboard entry means an individualized programming code provided to the user, said code providing the user with said incoming signal for the amount of allotted time remaining without disruption,
   disruption means coupled to said programming means wherein, when said programming allotted time of a user has been exhausted, said incoming signal source is disrupted while said incoming power source is not disrupted and display area simultaneously displaying the amount of allotted time to a user and the allotted time remaining to a user.

2. The device of claim 1 wherein said programming mean includes an input terminal and an output terminal for operatively connecting said monitor to said signal source through shielded cables.

3. The device of claim 2 wherein said programming means further includes a jack which operatively couples to a source of power, said source of power defined as a 9-volt plug-in transformer.

4. The device of claim 3 wherein said programming means further includes a second source of power defined as a 9-volt transistor battery,
   said battery is located in a recessed compartment of said programming means,
   said recessed compartment includes a slideably removable cover, for easy access, removal and replacement of said battery.

5. The device claim 4 wherein said programming means further includes first, second and third diodes,
   said first and second diodes are operatively coupled to said battery thereby preventing said battery from discharging said second source of power to said programming means when said first source of power is functioning properly, and
   said third diode is operatively coupled to said battery thereby directing said second source of power to the maintenance of pre-stored programs in said programming means.

6. The device of claim 1 wherein said securing means of said programming means includes a sixteen key key-pad arrangement, said key-pad arrangement providing means for a user to enter said individualized programming codes and prompts,
   a display area further disposed on said top surface of said programming means and providing visual indicia to a user,
   wherein when said keys are depressed said display are through said visual indicia alerts the user of said programming code entered or of said programming prompts.

7. The device of claim 6 wherein said programming codes may be entered and stored in said programming means for multiple users;
   wherein said display area is dividable to display multiple messages indicative of time allotted to a specific user, programming selections, time of day, user codes, owner codes, and time remaining for a specific user, said time remaining message being constantly updated to display the precise time of viewing available to the specific user;
   wherein said disruption means and said programming means are configured such that multiple incoming signal sources may be disrupted and different amounts of time may be allotted by said programming means to selectively disrupt viewing of any combination of incoming signals, whereby a user is assigned multiple separate allotted times, one for each incoming signal source;

wherein each of said programming codes of said programming means assigned to a different user may be provided with different times allotted for undisrupted viewing;

wherein said programming means includes an input means in the form of said sixteen key key-pad, said key-pad having keys operatively coupled to said programming means, said programming means utilizing instructions entered by said key-pad to program said device to allot time to a user, said keys having indicia in the form of printed lettering, said lettering corresponding to programming instructions associated with depression of said keys, some of said keys having multiple indicia such that single keys may provide multiple instructions to said programming means depending on the sequence of depression of said keys;

wherein said programming instructions associated with said key-pad keys include:

designation of a plurality of separate specific user identification numbers by which a user who enters one of the numbers disables said disruption means and causes an allotted time remaining associated with the identification number entered to be displayed and decremented, said user identification number inputted by depression of four keys in sequence, the keys having numbers printed thereon corresponding to digits forming the identification numbers; and designation of a specific amount of time allotted associated with each identification number from which remaining time is computed and displayed, said specific amount of time allotted being inputted by depression of four keys in sequence, the keys having numbers printed thereon corresponding to digits forming the time allotted;

wherein said user identification numbers form codes utilizable by separate users to disable said disruption means for an amount of time allotted to that code, one code designated as a free code, said free code having an infinite amount of time allotted thereto, whereby inputting of the code into the programming means disables the disruption means until the time allotted to the inputted code has passed;

wherein a master code is selectable upon an initial power up of said device through utilization of said keys of said key-pad, said master code being inputtable into said key-pad and into said programming means, said master code providing access to all user codes and allotted times, whereby various codes and allotted times may be altered after inputting said master code;

wherein said time remaining for each said user is periodically reinitialized to equal said time allotted for each said user, said periodic reinitialization occurring on a weekly, seven day cycle;

wherein said disruption means disrupts an incoming signal source by interposing a switch in a conduit transmitting said incoming signal, said conduit being a shielded cable having means to prevent radiation from said incoming signal source from by-passing said switch when said switch is closed, said switch blocking said conduit when said switch is closed and said disruption means is activated.

8. A device for controlling a restricted user's television viewing time, comprising, in combination:
a television monitor,
an incoming signal source operatively connected to said monitor,
a power supply connection means,
programming means interposed between said monitor and said signal source such that an allotted amount of time provided by an authorized programmer in which said monitor may be utilized by a user,
access restriction means coupled to said programming means including an input keyboard integral therewith requiring an authorized programmer access code on said input keyboard to enter or modify said allotted amount of time,
a user access code,
said access restriction means requiring said user access code to be inputted on said input keyboard to allow a user to view said television monitor without said incoming signal source being disrupted for an amount of time corresponding to said allotted amount of time,
said programming means including a processor circuit, a radio frequency switch circuit, and a power supply circuit all operatively coupled such that when said programmed allotted time of a user has been exhausted, said incoming signal source is disrupted without disruption of said power supply connection means and display area simultaneously displaying the amount of allotted time to a user and the allotted time remaining to a user.

9. The device of claim 8 wherein said processor circuit includes a microcontroller, an address latch and a programmable memory operatively coupled to said microcontroller requiring identification by a user to activate said monitor such that when said monitor is activated by a user, said programming means enables or disables said incoming signal source, based on said programmed allotted time stored in said programmable memory and user information stored in said address latch.

10. The device of claim 9 wherein said microcontroller further includes an internal clock, wherein said internal clock is configured such that it keeps track of said programmed allotted time for each user,
wherein when said programmed allotted time of a user has been exhausted, said internal clock generates an interrupt signal whereby said incoming signal source is disrupted.

11. The device of claim 10 wherein said interrupt signal is defined as a high impedance negative −9 V signal.

12. The device of claim 11 wherein said negative −9 V signal is transmitted via a plurality of control logic circuits to said radio frequency switch circuit.

13. The device of claim 12 wherein said radio frequency switch circuit further includes;
a plurality of diodes,
a plurality of capacitors,
a plurality of chokes, and
input terminal and a output terminal, wherein said input terminal, diodes, capacitor, chokes and output terminal are operatively coupled such that when said negative −9 V signal is transmitted to said radio frequency switch circuit at said input terminal, said negative −9 V signal is then transmitted to said diodes, said capacitors, said chokes and said output terminal, respectively, thereby disrupting said incoming signal source.

14. The device of claim 10 wherein when said programmed allotted time of a user has not been exhausted, said terminal clock generates a non-interrupt signal whereby said incoming signal source is not disrupted.

15. The device of claim 14 wherein said non-interrupt signal is defined as a low impedance positive 9 V signal.

16. The device of claim 15 wherein said positive +9 V signal is transmitted via a plurality of control logic circuits to said radio frequency switch circuit.

17. The device of claim wherein when said positive +9 V signal is transmitted to said radio frequency switch circuit at said input terminal, said positive +9V signal is than transmitted to said diodes, said capacitors, said chokes and said output terminal, respectively, thereby allowing said incoming signal source to be transmitted to said monitor;

wherein said display area is dividable to display multiple messages indicative of time allotted to a specific user, programming selections, time of day, user codes, owner codes, and time remaining for a specific user, said time remaining message being constantly updated to display the precise time of viewing available to the specific user; wherein said disruption means and said programming means are configured such the multiple incoming signal sources may be disrupted and different amounts of time may be allotted by said programming means to selectively disrupt viewing of any combination of incoming signals, whereby a user is assigned multiple separate allotted times, one for each incoming signal source;

wherein each of said programming codes of said programming means assigned to a different user may be provided with different times allotted for undisrupted viewing;

wherein said programming means includes an input means in the form of said sixteen key key-pad, said key-pad having keys operatively coupled to said programming means, said programming means utilizing instructions entered by said key-pad to program said device to allot time to a user, said keys having indicia in the form of printed lettering, said lettering corresponding to programming instructions associated with depression of said keys, some of said keys having multiple indicia such that single keys may provide multiple instructions to said programming means depending on the sequence of depression of said keys;

wherein said programming instructions associated with said key-pad keys include:

designation of a plurality of separate specific user identification numbers by which a user who enters one of the numbers disables said disruption means and causes an allotted time remaining associated with the identification number entered to be displayed and decremented, said user identification number inputted by depression of four keys in sequence, the keys having numbers printed thereon corresponding to digits forming the identification numbers; and designation of a specific amount of time allotted associated with each identification number from which remaining time is computed and displayed, said specific amount of time allotted being inputted by depression of four keys in sequence, the keys having numbers printed thereon corresponding to digits forming the time allotted;

wherein said user identification numbers form codes utilizable by separate users to disable said disruption means for an amount of time allotted to that code, one code designated as a free code, said free code having an infinite amount of time allotted thereto, whereby inputting of the code into the programming means disables the disruption means until the time allotted to the inputted code has passed;

wherein a master code is selectable upon an initial power up of said device through utilization of said keys of said key-pad, said master code being inputtable into said key-pad and into said programming means, said master code providing access to all user codes and allotted times, whereby various codes and allotted times may be altered after inputting said master code;

wherein said time remaining for each said user is periodically reinitialized to equal said time allotted for each said user, said periodic reinitialization occurring on a weekly, seven day cycle;

wherein said disruption means disrupts an incoming signal source by interposing a switch in a conduit transmitting said incoming signal, said conduit being a shielded cable having means to prevent radiation from said incoming signal source from by-passing said switch when said switch is closed, said switch blocking said conduit when said switch is closed and said disruption means is activated.

18. A method instilling video viewing discipline in a video viewer, the steps including:

providing a user with physical access to a video output monitor, providing power to the monitor, interposing a signal blocker between the monitor and a signal source, and altering video output as a function of:

assigning a code to the viewer, allotting time to the code, blocking the video without blocking power to the monitor, unblocking the video upon entry of the viewer's code into a keypad entry device coupled to the signal blocker, decrementing the allotted time for an amount of time corresponding to the amount of time the video is unblocked until all allotted time has been exhausted, displaying the allotted amount of time and a remaining amount of time equal to the allotted amount of time less the amount of time corresponding to the amount of time the video is unblocked, simultaneously, upon a display device, and blocking the video without blocking power to the monitor upon exhaustion of the time.

19. The method of claim 18 wherein said allotting time to the code step of said altering video output step is defined as entering a programmer's master code into the keypad entry device, entering the signal source code, entering the current day and time, entering a user code, and inputting a time allotment for the user.

20. The method of claim 19 wherein said user code and said time allotment are initially programmed to automatically reset for each viewing period for each viewer.

21. The method of claim 20 wherein said time allotment may be selectively reprogrammed during said viewing period such that the designated viewer can be temporarily allotted more or less viewing time.

22. A television viewing limiter for preventing a viewer from watching the television more than desired by a programming individual comprising in combination:

- an input signal disruptor interposed between a television and a plurality of signal sources chosen from a group consisting of: antenna signals, Cable signals, Video Cassette Recorder signals, and Video game signals;
- a microcontroller operatively connected to said disruptor, such that said microcontroller causes said disruptor to disrupt said signals sources;
- a programming means operatively connected to said microcontroller which instructs said microcontroller concerning how much time is allotted to a viewer,
- said programming means including a keyboard access panel having a security code system included therein which precludes unauthorized users from utilizing said programming means;
- a viewer access means operatively connected to said microcontroller which provides the viewer with access to said microcontroller to block said microcontroller from disrupting said signal sources when said programming means allows access by said viewer;
- said access means including said keyboard access panel;
- a clock operatively connected to said microcontroller;
- wherein the programming individual utilizes said programming means to allot a specific amount of viewing time to the viewer and wherein the viewer can access said microcontroller to view said television while said microcontroller and said clock decrement the amount of allotted time until no allotted time is left and then activate said signal disruptor; and
- wherein said viewer access means includes a code which when entered on said keyboard access panel authorizes said input signal disruptor to be blocked and for a display to communicate to the user a running tally of an amount of the allotted time remaining before said input signal disruption means will be activated, said display simultaneously displaying said amount of allotted time and said allotted time remaining.

* * * * *